No. 836,238. PATENTED NOV. 20, 1906.
W. T. M. BRUNNEMER.
PLOW.
APPLICATION FILED MAR. 17, 1906.
4 SHEETS—SHEET 1.
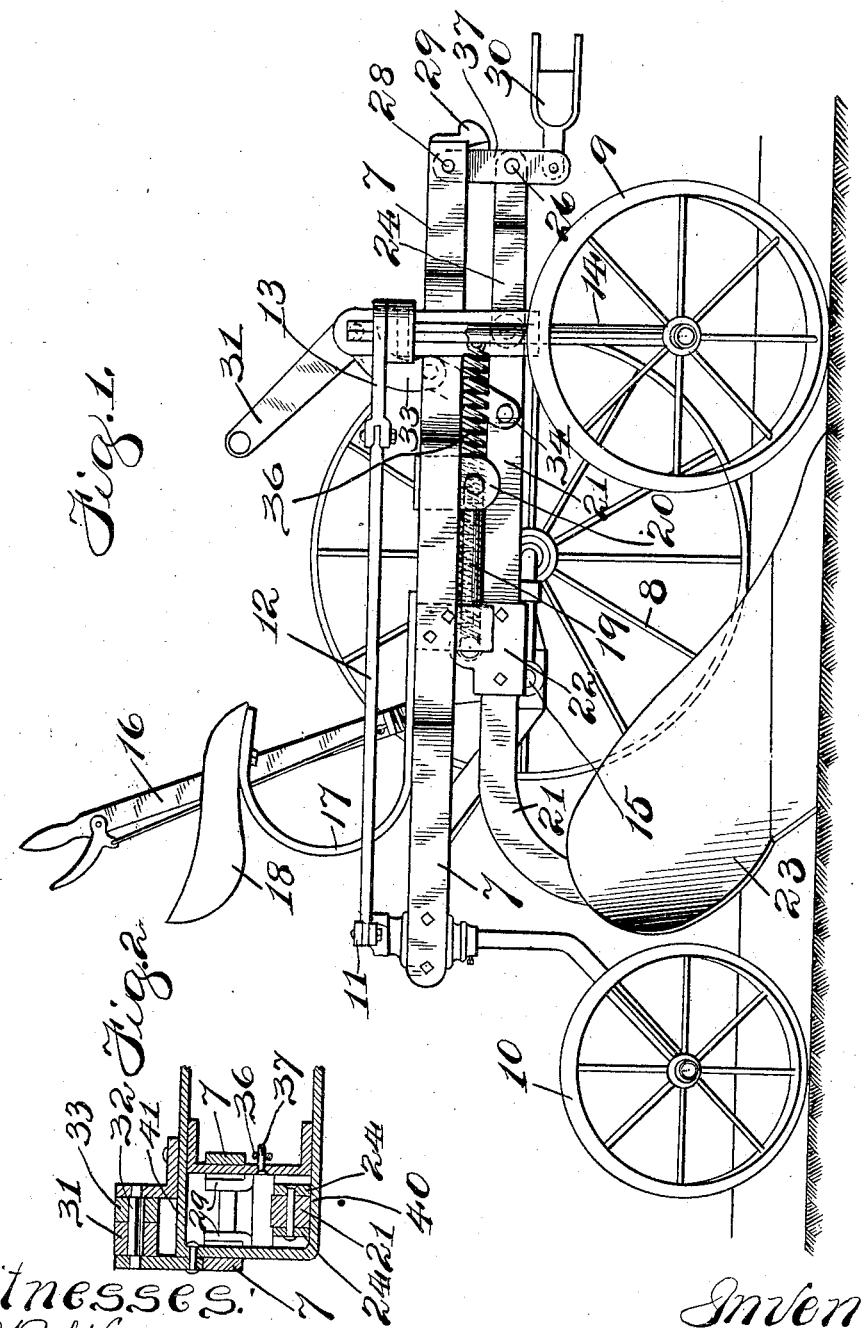
Witnesses.
J B Weir
G. V. Domarus
Inventor:
William T. M. Brunnemer,
by Bond Adams Pickard Jackson
his Atty.
THE NORRIS PETERS CO., WASHINGTON, D. C.

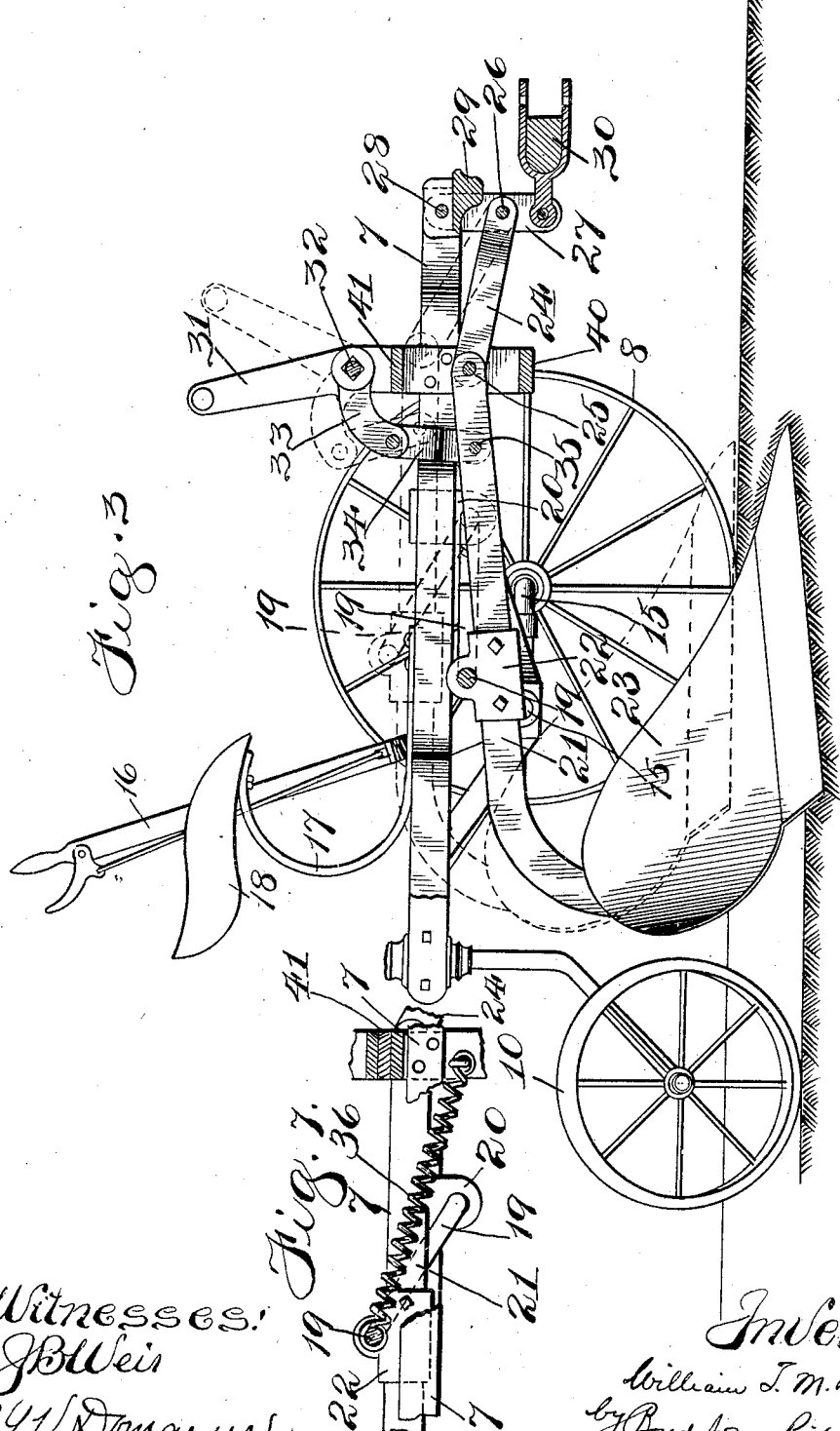

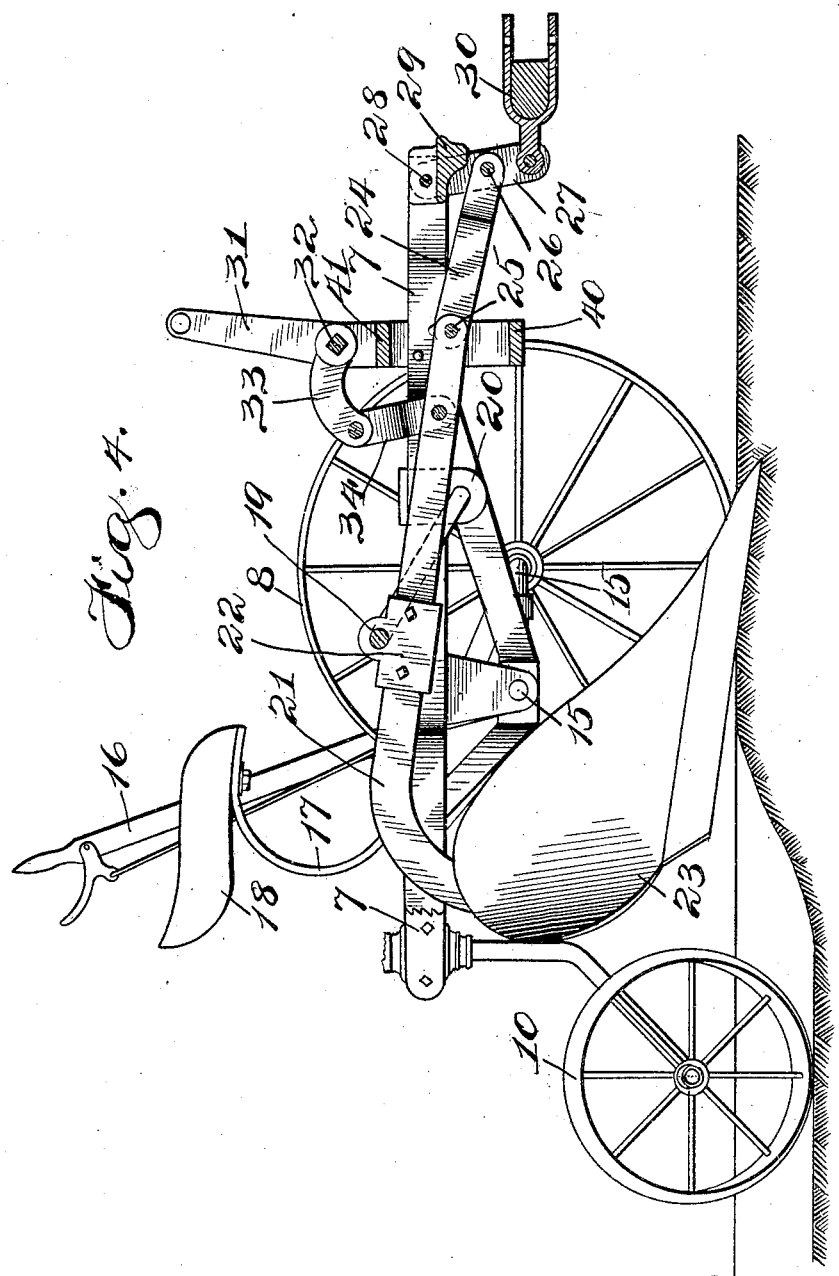

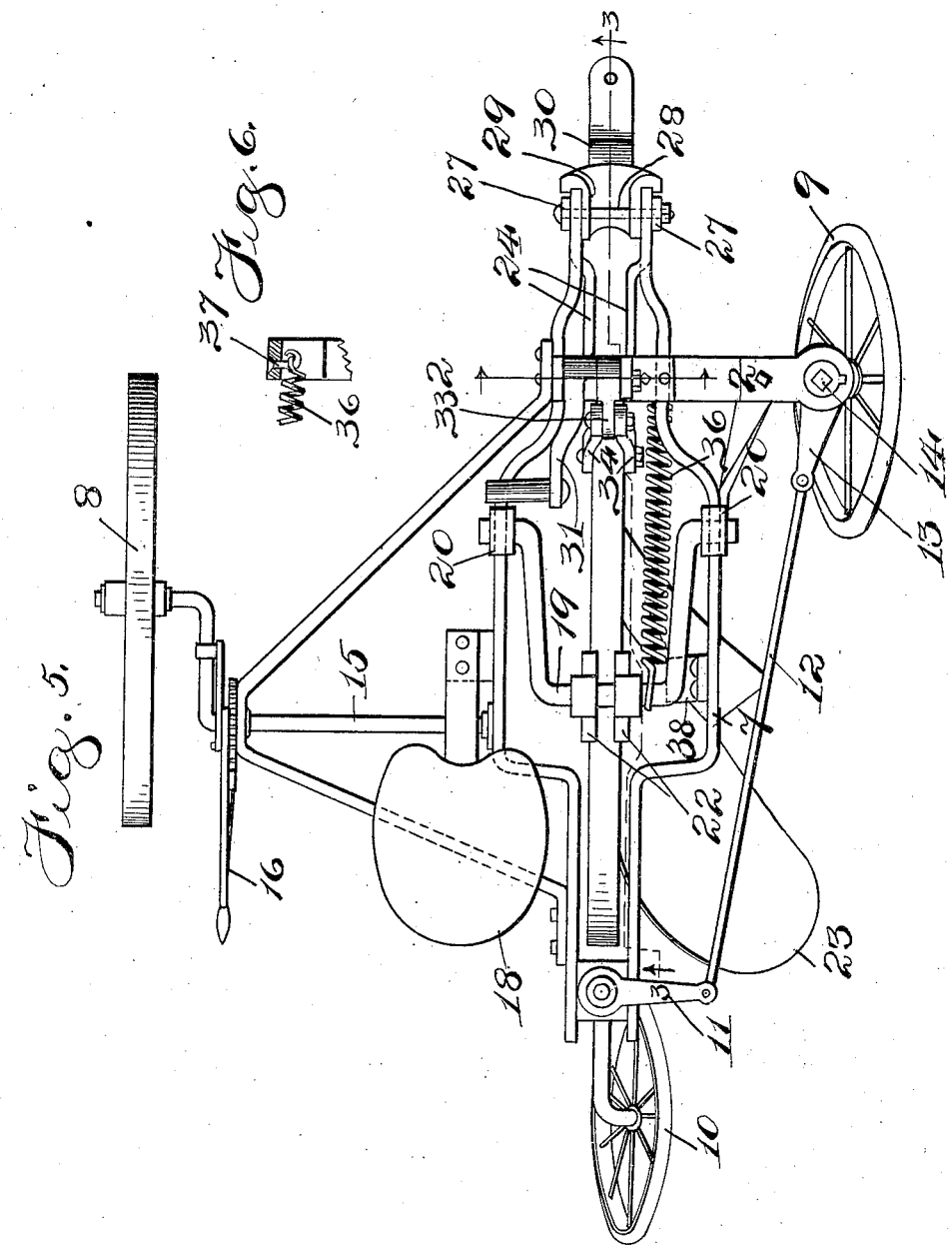

UNITED STATES PATENT OFFICE.

WILLIAM T. M. BRUNNEMER, OF MONMOUTH, ILLINOIS.

PLOW.

No. 836,238.

Specification of Letters Patent.

Patented Nov. 20, 1906.

Application filed March 17, 1906. Serial No. 306,529.

*To all whom it may concern:*

Be it known that I, WILLIAM T. M. BRUNNEMER, a citizen of the United States, residing at Monmouth, in the county of Warren and State of Illinois, have invented certain new and useful Improvements in Plows, of which the following is a specification, reference being had to the accompanying drawings.

My invention relates to riding or sulky plows, and has for its object to provide certain improvements in the mounting of the beam and the lifting mechanism by which the plow may be caused to run into or out of the ground and be supported out of operative position. I accomplish this object as illustrated in the drawings and hereinafter described. What I regard as new is set forth in the claims.

In the accompanying drawings, Figure 1 is a side elevation of my improved plow. Fig. 2 is a partial vertical cross-section on line 2 2 of Fig. 5. Fig. 3 is a partial longitudinal section on line 3 3 of Fig 5, showing the position of the parts just after the plow starts to run out of the ground. Fig. 4 is a similar view showing the position of the parts as the plow starts to run into the ground. Fig. 5 is a plan view. Fig. 6 is a sectional detail showing the connection of the lifting-spring, and Fig. 7 is a detail of the spring connections.

Referring to the drawings; 7 indicates the frame of the plow, which may be of any suitable shape to support the working parts. In the construction shown it is mounted on three wheels—a land-wheel 8, a furrow-wheel 9, and a caster-wheel 10, the caster-wheel spindle being provided with an arm or lever 11 at its end connected by a rod 12 with an arm 13 on the upper end of the furrow-wheel spindle 14 in the usual way. This arrangement forms no part of my present invention and is not essential to it.

As best shown in Figs. 1 and 5, the land-wheel 8 is mounted on a crank-axle 15, connected with the frame and arranged to be swung by a lever 16 in the usual way—as, for example, in the manner described in my Patent No. 736,932, dated August 25, 1903. Any other suitable arrangement may, however, be employed for adjusting the position of the frame 7.

17 indicates the seat-support, which is mounted on the frame 7, and 18 the seat carried thereby.

19 indicates a bail or crank which at its forward end is pivoted in suitable supports 20, carried by the frame, and at its rear end is pivotally connected with the plow-beam 21, preferably by means of a bracket 22. (Best shown in Figs. 3 and 4.) By this arrangement when the bail 19 is swung up or down it raises or lowers the plow-beam bodily.

23 indicates the plow.

As best shown in Figs. 2 and 3, the plow-beam is jointed or provided with an extension 24 at its forward end, said extension being pivoted to the beam at 26, as shown, in any suitably way. Said extension is preferably composed of two parallel bars, as shown in Fig. 5; but this is not essential. The forward end of the extension 24 is pivotally connected at 26 with a stirrup or pair of swinging links 27, which depend from the forward end portion of the frame, said stirrup being pivotally connected at its upper end with the frame, as shown at 28. A lug 29, carried by the frame and projecting down in advance of the stirrup 27, serves to limit its forward movement.

As shown in Figs. 3 and 4, the stirrup 27 carries draft devices, such as a doubletree 30.

31 indicates a lever for controlling the position of the front end of the beam, said lever being pivotally connected with the frame, as shown at 32 in Figs. 3 and 4, and being provided with a rearwardly-extending arm 33, which connects by one or more links 34, preferably two, with the forward portion of the beam, as shown at 35. The lever 31 is substantially a bell-crank lever, and it may be operated either by hand or by foot, as may be desired.

36 indicates a lifting-spring, the rear end of which is connected with the bail 19, preferably at the arch portion thereof, as shown in Fig. 5. The forward portion of said spring is connected with the forward portion of the frame of the machine by any suitable means, such as a hook 37. (Shown in Fig. 6.) The spring 36 is arranged so that when the plow is in normal operative position the spring is substantially in line with the bail 19, as shown in Fig. 1. When, however, the bail is swung upward, the rear end of the spring is raised out of line with the pivots of the bail, and consequently it acts to rock the bail on its pivots and lift the plow, as illustrated in Fig. 7.

38 indicates a stop secured to the frame and projecting under one arm of the bail 19, as shown in Fig. 5. Said stop serves to limit the downward movement of the bail and the rear portion of the plow-beam, preventing them from going beyond the proper working position. Stops 40 and 41 above and below the front end of the beam limit its range of movement.

The normal operative positions of the plow and of the lifting mechanism are shown in Fig. 1, at which time, as has been suggested, the lifting-spring 36, being substantially in alinement with the axis of the bail, has no lifting effect. To cause the plow to run out of the ground, the lifting-lever is thrown forward into the position shown in Fig. 3, thereby raising the forward end of the beam, swinging it upon the bail 19, and directing the point of the plow upward, so that as the machine progresses the plow is caused to run out of the ground. This also swings the bail 19, raising the rear portion thereof and lifting the plow. As soon as the rear portion of the bail rises far enough to carry the spring out of alinement with the axis of the bail the spring begins to help lift the plow, this action increasing as the plow rises. When the plow reaches its highest position, (shown in dotted lines in Fig. 3,) it is held in such position by the action of the spring. It will be noted that the weight of the draft devices is at all times carried by the frame, so that when the plow is lifted it is not necessary to lift the draft devices also. This is an important advantage, since in many localities a large number of horses are hitched to a plow, and the weight of the draft devices is very great. It will also be noted that when the plow is in its highest position the beam and the extension thereof are angularly disposed relatively to each other and that when the draft of the team is applied to the beam extension it tends to depress the forward end of the beam and throw it into alinement with the beam extension, as shown in Fig. 4. This directs the point of the plow downward, so that when the lever 31 is actuated to lower the plow it has a tendency to run into the ground, as shown. The drawing back of the lever 31 not only moves the bail down to operative position, but also aids in tipping the plow-point downward, and thus coöperates with the draft of the team to overcome the lifting effect of the lifting-spring. The lever 31 and arm 33 may be made in one piece, if desired; but I prefer to make them separate and fit the arm 33 upon a squared portion of the pivot 32, which carries said lever.

It will be understood that while I have described in detail the particular embodiment of my invention illustrated in the accompanying drawings, I do not restrict myself to such details of construction except in so far as they are particularly claimed, as my invention includes generically the subject-matter of the broader claims.

That which I claim as my invention, and desire to secure by Letters Patent, is—

1. In a plow, the combination of a frame, a vertically-swinging support, a plow-beam mounted on said support, means for swinging said support draft devices supported independently of the beam, and means for tilting said beam to cause the plow to run into or out of the ground.

2. In a plow, the combination of a frame, a vertically-swinging support, a plow-beam mounted on said support, means for swinging said support draft devices supported independently of the beam, means for tilting said beam to cause the plow to run into or out of the ground, and an extension pivotally connected with said beam and with said draft devices.

3. In a plow, the combination of a frame, a vertically-swinging support carried thereby, a plow-beam pivotally connected with said support and adapted to be raised or lowered by the swinging of said support, means for swinging said support, a lever for swinging said beam upon its support and an extension pivotally connected with said beam.

4. In a plow, the combination of a frame, a vertically-swinging support, a plow-beam mounted on said support, means for swinging said support draft devices supported independently of the beam, means for tilting said beam to cause the plow to run into or out of the ground, and means pivotally connecting the draft devices with the beam.

5. In a plow, the combination of a frame, a swinging support pivotally carried thereby, a beam pivotally connected with said swinging support, a beam extension pivotally connected with the forward portion of the frame and with said beam, and mechanism for tilting the beam.

6. In a plow, the combination of a frame, a swinging support pivotally carried thereby, a beam pivotally connected with said swinging support, a beam extension pivotally connected with the forward portion of the frame and with said beam, mechanism for tilting the beam, and draft devices supported by said frame.

7. In a plow, the combination of a frame, a swinging support, a plow-beam mounted on said support, draft devices supported independently of the beam, means for tilting said beam to cause the plow to run into or out of the ground, and a lifting-spring for lifting the beam.

8. In a plow, the combination of a frame, a vertically-swinging support pivotally carried thereby, a beam pivotally connected with said swinging support, a beam extension pivotally connected with the forward portion of the frame and with said beam, mechanism for tilting the beam, and a lifting-spring for lifting the beam.

9. In a plow, the combination of a frame, a plow-beam, a vertically-swinging support for raising and lowering the plow-beam, means for swinging said support draft devices supported independently of the beam, and means connecting the draft devices with the beam.

10. In a plow, the combination of a frame, a plow-beam, means for raising and lowering the plow-beam, draft devices supported independently of the beam, and a beam extension pivotally connecting the beam with the draft devices.

11. In a plow, the combination of a frame, a plow-beam, draft devices supported independently of the beam, and means connecting said draft devices with the forward portion of the beam, said connecting means being arranged to secure the tilting of the beam by the draft of the team when the plow-beam is in its elevated position.

12. In a plow, the combination of a frame, a plow-beam, means for raising and lowering the beam, a lever for tilting the beam, and draft devices coöperating with said lever to tilt the beam to depress the point of the plow when the beam is in its elevated position.

13. In a plow, the combination of a frame, a plow-beam, means for raising and lowering the beam, a lever for tilting the beam, draft devices coöperating with said lever to tilt the beam to depress the point of the plow when the beam is in its elevated position, and a lifting-spring for lifting the beam out of operative position.

14. In a plow, the combination of a frame, a plow-beam, means for raising and lowering the beam, a lever for tilting the beam, and draft devices coöperating with said lever to tilt the beam to depress the point of the plow when the beam is in its elevated position, said draft devices being supported independently of the beam.

WILLIAM T. M. BRUNNEMER.

Witnesses:
   JOHN L. JACKSON,
   MINNIE A. HUNTER.